United States Patent [19]
Bell et al.

[11] Patent Number: 5,997,946
[45] Date of Patent: Dec. 7, 1999

[54] SOLID COMPOSITION

[75] Inventors: Gordon Alastair Bell, Maidstone; Rowena Roshanthi Landham, Tunstall, both of United Kingdom

[73] Assignee: Zeneca Limited, United Kingdom

[21] Appl. No.: 09/068,464

[22] PCT Filed: Nov. 28, 1996

[86] PCT No.: PCT/GB96/02947

§ 371 Date: May 7, 1998

§ 102(e) Date: May 7, 1998

[87] PCT Pub. No.: WO97/20627

PCT Pub. Date: Jun. 12, 1997

[30] Foreign Application Priority Data

Dec. 6, 1995 [GB] United Kingdom .................... 9524918

[51] Int. Cl.$^6$ ....................................................... B01J 13/10
[52] U.S. Cl. .................................. 427/213.3; 427/213.31; 427/214; 428/402.2; 428/402.21; 264/4.1; 264/4.33
[58] Field of Search ............................ 427/213.3, 213.31, 427/214; 428/402.2, 402.21; 264/4.1, 4.33

[56] References Cited

U.S. PATENT DOCUMENTS

| 5,250,344 | 10/1993 | Williamson et al. | 428/143 |
| 5,271,961 | 12/1993 | Mathiowitz et al. | 427/213.31 |
| 5,296,266 | 3/1994 | Kunugi et al. | 427/213.36 |

FOREIGN PATENT DOCUMENTS

| 0 470 715 A2 | 7/1991 | European Pat. Off. . |
| 2-268611 | 11/1990 | Japan . |
| 2 095 558 | 10/1982 | United Kingdom . |
| 93/23999 | 12/1993 | WIPO . |
| 94/03057 | 2/1994 | WIPO . |
| 94/23573 | 10/1994 | WIPO . |

*Primary Examiner*—Nathan M. Nutter
*Attorney, Agent, or Firm*—David P. LeCroy

[57] ABSTRACT

A new and novel solid, microencapsulated product comprising a microencapsulated material contained within a cast, water-soluble, film-forming polymer and the process for preparing such product is disclosed.

12 Claims, No Drawings

SOLID COMPOSITION

This application is the National Stage of International Application No. PCT/GB/02947, internationally filed on Nov. 28, 1996.

This invention relates to solid compositions and in particular to solid, water-dispersible compositions containing microencapsulated materials and to a process for their manufacture.

Microencapsulation is a technique used in a variety of industries including for example the agrochemical industry. The technique of microencapsulation generally involves the formation of a dispersion or emulsion of a relatively water-immiscible liquid in an aqueous medium to form an oil phase. The oil phase contains the material to be encapsulated, for example a liquid, water-immiscible agrochemical, as well as one or more monomers which forms a polymeric microcapsule wall surrounding the oil phase droplet when polymerisation is initiated, for example by heating. A large number of variants of the microencapsulation process are known. Thus, for example, the liquid, water-immiscible pesticide which forms the material to be encapsulated may be a low-melting solid agrochemical which is emulsified as a melt or the liquid, water-immiscible agrochemical may be a solution of a solid agrochemical in an appropriate water-immiscible solvent. As used herein the term "microencapsulated material" means any material housed within a polymeric microcapsule shell. As noted above, the microencapsulated material is generally a relatively water-immiscible material and is formed as a suspension of the microcapsules in an aqueous phase.

Microencapsulated materials have a number of advantages as compared with a simple oil-in-water emulsion. In the agrochemical industry for example, microencapsulated suspension formulations are used to reduce toxicity and operator exposure as compared with simple emulsion concentrate formulations. Microencapsulated suspension formulations are also used to provide controlled release of the agrochemical, the rate of release being determined for example by the thickness of the wall of the microcapsule and by the nature of the polymeric wall material.

As noted above, microencapsulated formulations are manufactured and used in the form of an aqueous suspension. In agrochemical use for example, the suspension is generally diluted prior to use. There is however increasing interest in the agrochemical industry in the use of solid rather than liquid formulations, since such formulations have advantages in terms of reduced transport costs, greater ease of handling and greater customer acceptability. Container contamination may also be greatly reduced by the use of a day, solid formulation and container disposal may thus be simplified. We have found however that conventional methods for the conversion of liquid formulations into solid compositions, for example conventional granulation techniques, fail with microencapsulated suspensions because the processing involved tends to rupture the microcapsule wall and release the microencapsulated material. There is thus a need for a solid formulation of a microencapsulated material in which the microcapsules remain largely intact and which permits the regeneration of a suspension of microencapsulated material when the solid formulation is dissolved in water.

We have now found that such a product may be formed by means of the casting of a film-forming aqueous medium containing the microencapsulated material.

The casting of film-forming polymers, for example "tape casting" to form polymer sheets is used in a number of industries and the techniques involved will be known to those skilled in the art.

In WO 93123999 there is disclosed a packaging for storing and releasing incompatible crop protection materials in which a chemical is "encapsulated" in a water-soluble polymer film. However, the crop protection chemical, which may be in the form of a high-melting solid, a liquid, a wax, a granule or a powder, is merely added to a solution of the polymer in water and dried to form a suspension in the polymer film. Whilst the solid film containing the crop protection chemical does provide some handling advantages, once re-dissolved in water the crop protection chemical is regenerated in the form of an aqueous solution, emulsion or dispersion and has none of the advantages of a microencapsulated product. Furthermore polymer films containing a liquid crop protection chemical have poor handling properties and stability and it is only possible to incorporate relatively low levels of a liquid crop protection chemical using this technique.

According to the present invention there is provided a process for producing a solid, microencapsulated product which comprises (i) preparing a film-forming aqueous medium comprising a film-forming polymer and an aqueous suspension of a microencapsulated material, (ii) casting the aqueous medium thus formed onto a substrate and (iii) drying the cast medium to form a cast of the film-forming polymer containing the microencapsulated material.

The cast of the film-forming polymer containing the microencapsulated material is preferably removed from the substrate after drying to form a substantially dry "cast tape" comprising a microencapsulated material contained within a cast, water-soluble, film-forming polymer.

Thus according to a further aspect of the present invention there is provided a solid, microencapsulated product, for example a microencapsulated agrochemical product, comprising a microencapsulated material contained within a cast, water-soluble, film-forming polymer.

The term "film-forming" polymer includes any polymer which is capable of providing film-forming properties in the presence of water. The film-forming polymer will generally be water-soluble but could also provide a film-forming aqueous medium in which the film-forming polymer is present in the form of a dispersion, and in particular a colloidal dispersion or in the form of a sol or in the form of a solution containing some dispersed material.

The film-forming aqueous medium comprising an aqueous suspension of the microencapsulated material and the film-forming polymer may be prepared by the incorporation of the film-forming polymer during the microencapsulation process itself, or the film-forming polymer may be incorporated in a pre-formed aqueous suspension of a microencapsulated product. In general, the addition of all the film-forming polymer such that a relatively viscous film-forming aqueous medium is present during the microencapsulation process itself is likely to produce a medium with an undesirably high viscosity and consequent encapsulation problems. It is preferred therefore to incorporate the film-forming polymer to a pre-formed aqueous suspension of the microencapsulated product, although it would of course be possible to incorporate a proportion of the film-forming polymer during the encapsulation process and the remainder of the film-forming polymer to the encapsulated product thus formed.

The process of the present invention is not generally dependent on the nature of the aqueous suspension of the microencapsulated material which is used as starting material and a wide range of such products may be used. Typical polymers which may be used to form the microcapsule wall include polyureas and urea/formaldehyde resins. The polyureas may typically be produced by condensation of one or more polyisocyanates or they may be produced by reaction between an organic polyisocyanate and an organic amine. Urea/formaldehyde resins are typically produced by self-condensation of etherified amino resins. Other known types of microcapsule wall polymers include polyamides, polyesters, polyurethanes and polycarbonates.

The microencapsulated material may contain conventional adjuvants and additives such as surfactants.

The process of the present invention is applicable in particular to the formation of a solid, microencapsulated product containing a solid or liquid agrochemical product such as a herbicide, insecticide, fungicide, plant growth regulator, nematocide or an agrochemical adjuvant. The scope of the invention is not however limited to agrochemical products, and may be applied to any suitable microencapsulated product.

Suitable film-forming polymers include both synthetic and natural polymers such as polyvinylpyrrolidone, polyvinyl alcohol, partially hydrolysed polyvinyl acetate, modified polyvinylpyrrolidone such as a polyvinylpyrrolidone/vinyl acetate copolymer, polyethylene oxides, ethylene/maleic anhydride copolymer, methyl vinyl ether-maleic anhydride copolymer, water-soluble cellulose such as carboxymethylcellulose, water-soluble polyamides or polyesters, copolymers and homopolymers of acrylic acids, starches, natural gums such as alginates, dextrins and proteins such as gelatins and caseins. Mixtures of such film-forming polymers may also be used.

The rate of dissolution of the cast product in water will depend on a number of factors, including in particular the nature of the film-forming polymer and the microencapsulated material. In some applications of the present invention it is desirable for the cast product to dissolve rapidly when added to water. For example if the cast product contains an agrochemical which it is desired to dissolve in a spray tank to form a suspended microencapsulated material, then relatively rapid dissolution will be desired. In an alternative embodiment of the present invention, it may be desired to form a cast product which is not added to water but which releases the microencapsulated product slowly over a period of time, for example under the influence of moisture in the atmosphere or as a result of slow diffusion of active material through the microcapsule walls and thence through the solid water-soluble polymer. An example of this application for example is the formation of a cast tape containing a public health product which is located in the home and slowly releases insecticide or other active material.

We have found that polyvinylpyrrolidone is particularly suitable as a film-forming polymer forming a cast product which dissolves and generally disperses rapidly in water, depending on the other components of the cast product. Commercially available film-forming water-soluble or water-dispersible grades of polyvinylpyrrolidone have molecular weights in the range from about 8,000 to greater than 1,000,000 Dalton. A preferred grade of polyvinylpyrrolidone has a molecular weight in the range from 30,000 to 360,000 and in particular from 40,000 to 60,000. Polyvinylpyrrolidones having a molecular weight below about 30,000 tend to form cast tapes which dissolve relatively rapidly in water but are relatively weak. Polyvinylpyrrolidones having a molecular weight above about 60,000 tend to form cast tapes which are relatively strong but dissolve only slowly in water. We have found that good results may be obtained using mixtures of film-forming polymers of different molecular weights. For example a mixture of a relatively high molecular weight polyvinylpyrollidone, for example a polyvinylpyrrolidone of molecular weight of from about 40,000 to about 80,000, and a relatively low molecular weight polyvinylpyrrolidone, for example a polyvinylpyrrolidone of molecular weight from about 8,000 to 30,000 may combine excellent strength with relatively rapid dissolution. It is believed that the relatively low molecular weight polyvinylpyrrolidone may act as a disrupter to promote rapid disintegration of the structure of the tape on contact with water without significantly sacrificing the strength of the tape when dry.

Film-forming polymers which form cast products which dissolve very rapidly in water may also tend to adsorb water from the atmosphere so that the surface may become slightly tacky to the touch. It is possible to protect the surface, for example by lamination as hereinafter described. Alternatively a compromise may be reached between an advantageous rate of dissolution and minimum tackiness by selection of the molecular weight of the polymer or by using a mixture of rapidly dissolving polymer such as polyvinylpyrrolidone of molecular weight from 40,000 to 50,000 and a less rapidly dissolving polymer such as carboxymethylcellulose. There is generally no particular need for the cast product, for example the cast film, to show particular strength since it merely has to have sufficient integrity to be handled before it is dissolved. If however the cast product of the invention such as the cast film is to be used as a container, for example as a water-soluble bag container, it may be desirable to use a relatively strong polymer such as polyvinyl alcohol or partially hydrolysed polyvinylacetate.

Sufficient of the film-forming polymer should be used to form a film-forming aqueous medium, by which is meant an aqueous medium having a suitable rheology and in particular a suitable viscosity for casting on the substrate. If there is insufficient polymer in solution, the aqueous medium will tend to run off the substrate and form too thin a film. If on the other hand too much polymer is present in the aqueous medium, it will not flow smoothly and the resultant film will not be self-levelling and uniform. The optimum concentration of polymer to provide an effective film-forming aqueous medium will vary depending on the exact nature and grade of polymer used but may be determined by simple and routine experimentation. Typical concentrations are illustrated in the Examples. Thus for example the concentration of the film-forming polymer in the film-forming aqueous medium is typically from 5 to 95% by weight, for example from 5 to 50% by weight.

The ratio of film-forming polymer to microencapsulated material in the film-forming aqueous medium, and hence the proportion of film-forming polymer in the dry cast product, may be varied within wide limits depending on the specific application envisaged. Sufficient film-forming polymer should be used to provide a workable and flexible dry cast product. In general, if for example the cast product is a tape cast sheet, the ratio of film-forming polymer to microencapsulated material in the film-forming aqueous medium is about 5 to 99% by weight for example about 10 to 50% by weight, resulting in a proportion of film-forming polymer of about 0.1 to 95% by weight, for example abut 5 to 50% by weight of in the dry cast tape, depending on the weights of any other components which may be present in the film-forming aqueous medium.

The concentration of the microencapsulated material in the cast product may similarly be varied within wide limits and typically ranges from 0.1 to 95% by weight.

A typical aqueous microencapsulated suspension containing about 50% water and 50% solid material generally provides a convenient proportion of water such that addition of sufficient film-forming polymer to form the film-forming aqueous medium gives a suitable proportion of film-forming polymer in the dry cast product. A more concentrated microencapsulated suspension would generally require less film-forming polymer relative to the microencapsulated material to provide a film-forming aqueous medium with the result that the proportion of film-forming polymer in the dry, cast product would be reduced. Conversely, a more dilute microcapsule suspension would generally require more film-forming polymer relative to the microencapsulated material to provide a film-forming aqueous medium with the result that the proportion of film-forming polymer in the dry, cast product would be increased. However, adjustments for dilute or concentrated microencapsulated suspensions may also be made by the addition of fillers, or the use of higher molecular weight or cross-linked polymers to provide the optimum rheological properties for the film-forming aqueous medium.

The film-forming polymer may be added to the aqueous microcapsule suspension as a solid or as a viscous aqueous concentrate. In either event stirring will be required to ensure uniform mixing. The stirring should not be so vigorous that the microcapsule walls are ruptured, but we have found that even relatively high-shear mixers may be used without problem for most conventional microencapsulated products. If aeration during mixing is deemed to be disadvantageous, the vigour of the mixing may be reduced or an anti-foam may be added or the film-forming aqueous medium may be left to de-aerate before use. We have found however that aeration of the aqueous film-forming medium is not necessarily a disadvantage and that aeration carried through from the aqueous film-forming medium to subsequent processing stages may provide a partially foamed dry, cast product having an improved rate of dissolution.

If desired, other components may be added to the film-forming aqueous medium. Thus for example it is desirable, particularly if the cast product is to be a cast tape (a film), to include a plasticiser to improve the flexibility of the cast product. Suitable plasticisers include glycerols, $C_2$ to $C_6$ glycols and polyglycols such as polyethylene glycol, dialkyl phthalates such as dioctyl phthalate, sorbitol and triethanolamine or mixtures thereof. In addition to improving the flexibility of the product a plasticiser may also have an advantageous effect on the rate of dispersion of the dry, cast product in water. The proportion of plasticiser is preferably within the range 0 to 80% by weight, for example from 5 to 30% by weight relative to the film-forming polymer.

Surfactants may be added to the film-forming aqueous medium both to enhance the rate of dispersion of the dry, cast product in water and also to affect the surface tension properties of the film-forming aqueous medium relative to the substrate on which it is cast. Thus for example a wetter may be added to ensure wetting of the substrate, for example if a plastics substrate is used. Surfactants may also be added which modify the surface tension of the wet cast film and ensure that on drying the film reduces in thickness with minimum shrinkage in the plane of the substrate on which it is cast. A wide variety of surfactants may be used for these purposes and suitable examples will occur to one skilled in the art. Solid surfactants may be present in relatively high loading in the cast product and may be used for example to provide adjuvant properties in the final application, for example as a wetter in a spray solution for agrochemical use.

An antifoam agent may be added to prevent excessive aeration during mixing of the film-forming aqueous medium, although as noted above aeration of the film-forming aqueous medium is not necessarily a disadvantage.

An inert filler may if desired be added to provide a correspondingly filled dry, cast product having properties normally associated with filled plastics products. Suitable fillers include organic or inorganic materials such as silica, mica, cellulosic fibre such as wood fibre, diatomaceous earth and urea. In general the use of an inert filler will provide an dry, low-cost and readily worked tape. Tapes containing an inert filler will in general however be slower to dissolve than a corresponding tape without a filler.

A viscosity aid may be added if desired to modify the viscosity of the film-forming aqueous medium, for example to minimise any settling of the microencapsulated product within the thickness of the wet film when it is first cast. Suitable viscosity-modifying aids include alginates, starch, gelatin, natural gums, hydroxyethyl cellulose, methyl cellulose, silica and clays.

The casting of the film-forming aqueous medium onto a substrate may take place using conventional techniques such as tape casting. In tape casting, a film is formed on a substrate and the thickness is adjusted to that required using a device such as a "doctor knife" which defines a pre-determined space between the surface of the substrate and the blade of the doctor knife. The substrate is conveniently a flat, planar surface but may also if desired possess indentations to provide appropriate corresponding patterning on the surface on the film. Similarly, the "doctor knife" may have a contoured blade to provide corresponding patterning on the top surface of the film. In the extreme, the substrate may comprise one or more wells into which the film-forming aqueous medium is cast so that discrete pellets or tablets are formed on drying. It is a particular advantage of such tape casting techniques that the mechanical forces applied are relatively slight so that any tendency to rupture the microcapsules contained within the film-forming aqueous medium during processing is minimised. In general, any casting technique may be used provided that the mechanical forces involved are such that relatively few of the microcapsules are ruptured. In commercial practice, it is normal to supply the film-forming medium (in this case the aqueous film-forming medium containing the suspended microencapsulated material) from a reservoir and to form the film continuously, for example by the use of a moving belt as substrate or by movement of a reservoir and associated doctor blade relative to a stationary substrate. In commercial practice it is usually convenient to use a metal substrate although a plastics substrate may be used if desired.

The cast medium may be dried under atmospheric conditions but it is more conveniently dried at elevated temperature. The upper limit of the temperature of drying will depend on the nature and temperature-sensitivity of the microencapsulated material. In general however it is sufficient to dry the cast medium at a temperature of from ambient to 100° C., for example from 40 to 60° C. It is to be understood that the drying process will not necessarily remove all traces of water, and indeed a small proportion of residual water in the dry, cast product may have a beneficial plasticising effect. Typically levels of water in the range of 0.1 to 20% by weight are to be expected in the dry, cast product. Heating may be achieved for example by passing the cast medium into an oven or heated space or by applying heat to the substrate. Once the cast medium is dried, it may be removed from the substrate for subsequent use.

The thickness of the cast product, for example the cast tape, may be varied within wide limits according to the desired application. Typically the thickness of a cast tape varies between about 0.04 mm to 5 mm depending on the flexibility and other characteristics desired. The dry tapes can be cut or fashioned to include a wide variety of shapes and designs, including for example discs, flakes, strips, tubes and spirals. The tape can be cut to provide a pre-determined metered dose of active ingredient which simplifies the formation of a dilute agrochemical spray for example. The tapes may also be embossed, corrugated or patterned to increase the surface area and may also carry printed information such as product and safety information.

For certain applications it may be desirable to protect the surface of the cast, dry product. For example it may be desired to protect a layer of microcapsules situated at or on the surface of the dry, cast product from damage. Alternatively, it may be desired to use a rapidly dispersing film-forming polymer which provides a certain "tackiness" of surface and which is suitably protected for some applications by a non-tacky finish. The surface of the cast product may readily be protected by lamination or co-casting with a layer of water-soluble polymer which contains no microencapsulated product and which may be the same as or different from the film-forming polymer. Alternatively, the cast, dry product may be housed in a water-soluble bag which may be manufactured from the same or different water-soluble polymer.

The invention is illustrated by the following Examples in which all parts and percentages are by weight unless otherwise stated.

EXAMPLE 1

This Example illustrates the formation of a cast tape based on the herbicide acetochlor in the form of a microencapsulated suspension.

Polyvinylpyrrolidone (1.5 g, molecular weight 44,000), glycerol (0.15 g), surfactant (0.05 g; SYNPERONIC NP15—a nonylphenol ethoxylate containing 15 moles of ethylene oxide per mole of nonylphenol) and anti-foam (MSA, supplied by Dow Chemicals) were added to 10 g of Acetochlor 40 CS (a cereal herbicide capsule suspension containing approximately 36% by weight of acetochlor encapsulated in a polurea wall in approximately 50% by weight of water). SYNPERONIC is a trade mark of Imperial Chemical Industries.

The mixture was stirred using a magnetic stirrer over a period of 15 to 30 minutes until a homogeneous, viscous slurry was obtained. The rheology of the slurry under high-shear conditions was as follows:

| | |
|---|---|
| Apparent viscosity (mPas, D 300s$^{-1}$, 25° C.) | 512 |
| Yield Value (Pa, Casson) | 0.373 |

The viscous film-forming medium was tape cast onto a polymer film (polyethylene terephthalate) as substrate using a "doctor blade" set at a blade height of 1 mm. The cast tape was dried for 15 to 20 minutes in an oven maintained at 50° C. and then stripped from the substrate as a coherent tape.

The tape cast product contained 74.0% microencapsulated acetochlor product (of which 72% was active ingredient), 22.3% polyvinylpyrrolidone, 2.2% glycerol, 0.7% surfactant and 0.7% anti-foam. The tape had a thickness of 0.42 mm and showed excellent strength and flexibility. It dispersed rapidly in water to form a microencapsulated suspension in which the microcapsule structure appeared under microscopic examination to be essentially unaffected. The dispersion time as measured by the standard test given below was 109 seconds.

The dispersion time of the tape was measured in a standard test by placing a piece of square tape weighing 150 mg±2 mg in a mesh basket which was suspended below the surface of 500 ml of tap water (20° C.±1° C.) contained in a 600 ml glass beaker. The water was stirred at 400 rpm using a 2 inch stirrer bar. The time taken for complete disintegration of the tape was noted.

EXAMPLES 2 TO 4

The procedure of Example 1 was repeated except that the glycerol content of the formulation was increased from 0.15 g to 0.25 g and polyvinylpyrrolidone was replaced as film-forming polymer by 2.5 g of carboxymethylcellulose (Example 2), by 2.5 g of AGRIMER VA6 (a copolymer of vinylacetate/vinylpyrrolidone in a molar ratio of 60/40). AGRIMER is a trade mark of ISP (Great Britain) Co Ltd. (Example 3) and by 2.5 g of AGRIMER AL 10 (an alkylated vinylpyrrolidone copolymer with 10% butylation— (Example 4). In the case of carboxymethylcellulose, 5 g of water was added to obtain the correct film-forming properties of the film-forming medium and in the case of AGRIMER AL10, 2.5 g of water was added.

Excellent tapes were formed in each case. The dispersion times as measured by the standard method were 140 seconds (Example 2), 169 seconds (Example 3) and 158 seconds (Example 4). The tape based on carboxymethylcellulose had an excellent low surface stickiness.

EXAMPLE 5

The procedure of Example 1 was repeated using acetochlor 40 CS (20 g), glycerol plasticiser (0.3 g), SYNPERONIC NP15 (0.1 g) and antifoam (0.1 g) to which was added a film-forming polymer consisting of a mixture of polyvinylpyrrolidone (2 g) and carboxymethylcellulose (1 g). Additional water (2 g) was added to provide the correct film-forming rheology. The resultant tape had excellent strength and flexibility and relatively low stickiness.

EXAMPLE 6

The procedure of Example 5 was repeated using a film-forming polymer consisting of a mixture of polyvinylpyrrolidone (1.5 g) and carboxymethylcellulose (1.5 g). The resultant tape had excellent strength and flexibility and relatively low stickiness.

EXAMPLE 7

The procedure of Example 5 was repeated using a film-forming polymer consisting of polyvinylpyrrolidone (3 g) and a plasticiser consisting of polyethylene glycol of molecular weight 200 (0.3 g). The resultant tape had excellent strength and flexibility.

EXAMPLES 8 to 11

The procedure of Example 1 was repeated using the weights of acetochlor 40 CS, polyvinylpyrrolidone (molecular weight 40,000), glycerol plasticiser, surfactant (SYNPERONIC NP 15) and antifoam indicated in Table 1. No additional water was added. The resultant tapes all had excellent strength and flexibility

TABLE 1

Weight of components in grams

| Example | Acetochlor 40 CS | Polyvinyl-pyrrolidone | Glycerol | Surfactant | Anti-foam |
|---|---|---|---|---|---|
| 8 | 10 | 2 | 0.2 | 0.05 | 0.05 |
| 9 | 10 | 2.3 | 0.25 | 0.05 | 0.05 |
| 10 | 10 | 1.5 | 0.15 | 0 | 0 |
| 11 | 20 | 3 | 0.2 | 0.1 | 0.1 |

EXAMPLE 12

The procedure of Example 1 was repeated using Acetochlor 40CS (20 g), polyvinylpyrrolidone (3 g), glycerol (0.3 g), antifoam MSA and MORWET D425 powder (0.05 g) (a solid surfactant composed of the sodium salt of alkylated naphthalene sulphonic acid).

The resultant tape had good strength, flexibility and relatively low stickiness. The tape dispersed in 177 seconds as measured using the standard method.

EXAMPLE 13

The general procedure of Example 1 was repeated using the same weights of polyvinylpyrrolidone (molecular weight 44,000), glycerol, surfactant, antifoam and acetochlor 40CS, except that 0.75 g of mica filler (Micro-Mica W1, Norwegian Talc Ltd) was added during the mixing of the polymer. The slurry was cast at a blade height of 11.3 mm.

The resultant tape was 0.56 mm thick, strong, flexible, of low surface stickiness and dispersed in 244 seconds as measured using the standard method.

EXAMPLE 14

The mixing/dispersion properties of the acetochlor tape produced according to Example 1 was assessed using an ALLMAN 100 liter sprayer.

The tank was filled to 50 liters with water (temperature 11° C.). 136 g of the tape was added to the tank while the water was recirculated/agitated at an operating pressure of 4 bar. The tank was then filled to 100 liters and spraying was commenced. Spray samples were examined when the water level in the tank was 100, 75, 50, 25 and 3 liters.

No nozzle blockage occurred during spraying, the spray samples examined were essentially uniform in colour and no tape residue was present in the base of the tank when spraying was completed.

EXAMPLE 15

Polyvinylpyrrolidone (molecular weight 44,000—3 g), glycerol (0.3 g), SYNPERONIC NP15 (0.1g) and antifoam MSA (0.1 g) were added to 20 g ICON 10 CS, an insecticide capsule suspension containing approximately 10% by weight of the active ingredient, lambda cyhalothrin, encapsulated in a polyurea wall in approximately 70% by weight water. ICON is a trade mark of Zeneca Limited. The mixture was stirred using a magnetic stirrer over a period of 15–30 minutes until a homogeneous, viscous slurry was obtained.

The viscous film-forming slurry was tape cast onto a polymer film as substrate, using a "doctor blade" set at a blade height of 1 mm. The cast tape was dried for 15–20 minutes in an oven maintained at 50° C. and then stripped from the substrate as a coherent tape.

The tape cast product contained 62% microencapsulated ICON product (of which about 32% was active ingredient), 32% polyvinylpyrrolidone, 3.3% glycerol, 11.1% surfactant and 1.1% antifoam. The tape was 0.34 mm thick and had excellent strength and flexibility. When dispersed in water to form a microencapsulated suspension, the microcapsule structure appeared under microscopic examination to be essentially unaffected. The dispersion time of the tape was 346 seconds as measured using the standard method.

EXAMPLE 16

Polyvinylpyrrolidone (molecular weight 44,000—5 g), glycerol (0.5 g), SYNPERONIC NP15 (0.1 g) and antifoam MSA (0.1 g) were added to 20 g ODRAM CS (a herbicide capsule suspension containing approximately 48% by weight of the active ingredient, molinate, encapsulated in an aminoplast wall in approximately 50% by weight water). ODRAM is a trade mark of Zeneca Inc. The mixture was stirred using a magnetic stirrer over a period of 15–30 minutes till a homogeneous, viscous slurry was obtained.

The viscous film-forming slurry was tape cast onto a polymer film as substrate, using a "doctor blade" set at a blade height of 1 mm. The cast tape was dried for 15–20 minutes in an oven maintained at 50° C. and then stripped from the substrate as a coherent tape.

The tape cast product contained 74% microencapsulated ODRAM product (of which about 96% was active ingredient), 22% polyvinylpyrrolidone, 3.7% glycerol, 0.4% surfactant and 0.4% antifoam. The tape was 0.58 mm thick and had excellent strength and flexibility. The tape did not disperse when immersed in water at 20° C. for minutes and was suitable for use as a non-dispersing tape for slow release of the active ingredient.

EXAMPLE 17

Polyvinylpyrrolidone (molecular weight 44,000—5 g), glycerol (0.5 g), SYNPERONIC NP15 (0.1 g) and antifoam MSA (0.1 g) were added to 20 g FUSILADE CS, a herbicide capsule suspension containing approximately 48% by weight of the active ingredient, fluazifop-P-butyl, encapsulated in a polyurea wall (15% wall material) in approximately 40% by weight water. FUSILADE is a trade mark of Zeneca Limited. The mixture was stirred using a magnetic stirrer over a period of 15–30 minutes till a homogeneous, viscous slurry was obtained.

The viscous film-forming slurry was tape cast onto a polymer film as substrate, using a "doctor blade" set at a blade height of 1 mm. The cast tape was dried for 15–20 minutes in an oven maintained at 50° C. and then stripped from the substrate as a coherent tape.

The cast tape product contained 62% microencapsulated FUSILADE product (of which about 89% was active ingredient), 34% polyvinylpyrrolidone, 3.4% glycerol, 0.7% surfactant and 0.7% antifoam. The tape was 0.76 mm thick and had excellent strength and flexibility. The tape dispersed in water to form a microencapsulated suspension in which the microcapsule structure appeared under microscopic examination to be essentially unaffected. The dispersion time of the tape was 636 seconds as measured by the standard method.

EXAMPLE 18

A mixture of polyvinylpyrrolidone polymers of molecular weights 8000 (5.8 g) and 57,000 (2.8 g) were added to 38.5 g of KARATE 25CS formulation (an insecticide microcapsule suspension containing approximately 23% by weight of lambda cyhalothrin encapsulated in a polyurea wall in approximately 50% by weight of water and stirred using a mechanical stirrer until all the polymer had dissolved. KARATE is a trade mark of Zeneca Limited. Morwet EFW (an anionic naphthalene sulphate wetting agent from Witco, 0.2 g), sorbitol (2.5 g), and silicone antifoam (0.15 g) were added and stirred for a further 15 minutes to ensure complete dispersion.

The resulting viscous film-forming slurry was tape cast onto a polymer film as substrate, using a 'doctor blade' set at a blade height of 1.2 mm. The cast tape was dried for 2 hours in an oven maintained at 50° C. and then stripped from the substrate as a coherent tape.

The dry tape contained 63% microencapsulated KARATE product (of which about 46% was the active ingredient lambda cyhalothrin), 28% polyvinylpyrrolidone polymers, 0.6% surfactant, 8% sorbital and 0.4% antifoam. The tape was 0.52 mm thick. When dispersed in water to form a microencapsulated suspension, the capsule walls appeared under microscopic examination to be essentially unaffected. The dispersion time of the tape was 420 sec when measured using the standard method.

EXAMPLE 19

A mixture of polyvinylpyrrolidone polymers of molecular weights 8000 (5.8 g) and 57,000 (2.8 g) were added to 31.5 of KARATE 25CS formulation and stirred using a mechanical stirrer until all the polymer had dissolved. Morwet EFW (0.2 g) and 7.0 g Microtalc filler (hydrated magnesium silicate with a mean particle size of approximately 7 $\mu$m) were added and stirred until all the powder was completely dispersed. Sorbitol (2.5 g), and silicone antifoam (0.15 g) were finally mixed in and stirred for a further 15 minutes to ensure complete dispersion.

The viscous film-forming slurry was tape cast onto a polymer film as substrate, using a 'doctor blade' set at a blade height of 1.2 mm. The cast tape was dried for 2 hours in an oven maintained at 50° C. and then stripped from the substrate as a coherent tape.

The dry tape contained 47% microencapsulated KARATE product (of which about 46% was the active ingredient lambda cyhalothrin), 25% polyvinylpyrrolidone polymers, 0.6% surfactant, 20% Microtalc filler, 7% sorbitol and 0.4% antifoam. The tape was 0.53 mm thick. When dispersed in water to form a microencapsulated suspension, the capsule walls appeared under microscopic examination to be essentially unaffected. The dispersion time of the tape was 620 sec when measured using the standard method.

EXAMPLE 20

The herbicidal efficiency of the cast tape of Example 1 was compared against that of the microencapsulated formulation from which the cast tape had been prepared. The cast tape of Example 1 and the corresponding microencapsulated formulation were dispersed in water to provide stock solutions which were diluted and applied to the weed species woolly cupgrass, broadleaf signalgrass, shattercane, giant foxtail, white proso millet, watergrass, large crabgrass and redroot pigweed. The two formulations were each applied at a rate of 10, 20, 40, 80 and 160 g/ha respectively of active ingredient and no significant herbicidal differences were detected between the tape cast formulation of the present invention and the corresponding liquid dispersed microencapsulated product.

What is claimed is:

1. A process for producing a solid, microencapsulated product which comprises
   (i) preparing a film-forming aqueous medium comprising a film-forming polymer and an aqueous suspension of a microencapsulated material,
   (ii) casting the aqueous medium thus formed onto a substrate and
   (iii) drying the cast medium to form a cast of the film-forming polymer containing the microencapsulated material.

2. A process according to claim 1 wherein the film-forming polymer is polyvinylpyrrolidone, polyvinyl alcohol, partially hydrolysed polyvinyl acetate, a polyvinylpyrrolidone/vinyl acetate copolymer, polyethylene oxide, ethylene/maleic anhydride copolymer, methyl vinyl ether-maleic anhydride copolymer, water-soluble cellulose, water-soluble polyamide or polyesters, a copolymer or homopolymers of acrylic acid, starch, a natural gum or a protein or a mixture of two or more thereof.

3. A process according to claim 2 wherein the film-forming polymer comprises a polyvinylpyrollidone having a molecular weight in the range from 30,000 to 360,000.

4. A process according to claim 2 wherein the film-forming polymer comprises a mixture of a polyvinylpyrollidone of molecular weight from 40,000 to 80,000 and a polyvinylpyrollidone of molecular weight from 8,000 to 30,000.

5. A process according to claim 1 wherein the film-forming polymer comprises a polyvinylpyrollidone of molecular weight from 40,000 to 50,000 and carboxymethylcellulose.

6. A process according to claim 1 wherein the concentration of the film-forming polymer in the film-forming aqueous medium is from 5 to 50% by weight.

7. A process according to claim 1 wherein a plasticiser is present in the film-forming medium.

8. A process according to claim 1 wherein a surfactant, a viscosity aid, an anti-foam or an inert filler is present in the film-forming medium.

9. A process according to claim 1 wherein the cast medium is dried at a temperature of from 40° C. to 60° C.

10. A process according to claim 1 wherein the surface of the cast product is protected by lamination or co-casting with a layer of water-soluble polymer which contains no microencapsulated product.

11. A solid, microencapsulated product prepared by a process according to claim 1.

12. A solid, microencapsulated product comprising a microencapsulated material contained within a cast, water-soluble, film-forming polymer.

* * * * *